May 4, 1943.   J. L. HIPPLE   2,318,392
PLANTING ATTACHMENT
Filed Dec. 23, 1940   2 Sheets-Sheet 1

Inventor
James L. Hipple
By Paul Pippel
Atty.

May 4, 1943.   J. L. HIPPLE   2,318,392
PLANTING ATTACHMENT
Filed Dec. 23, 1940   2 Sheets-Sheet 2

Inventor
James L. Hipple
By Paul O. Pippel
Atty.

Patented May 4, 1943

2,318,392

UNITED STATES PATENT OFFICE 2,318,392

PLANTING ATTACHMENT

James L. Hipple, Canton, Ill., assignor to International Harvester Company, a corporation of New Jersey Application December 23, 1940, Serial No. 371,259

11 Claims. (Cl. 111—67)

This invention relates to planting attachments adapted to be directly connected to tractors or the like, and more particularly, it relates to automatic control means for controlling the flow of seed from the seed hopper device which forms a part of the planting means.

It is an object of the present invention to provide a simple and efficient means for automatically disconnecting the tractor drive mechanism from the seed hopper device upon lifting the planter frame to its transport position.

It is another object of the invention to provide in such mechanism a simple means for adjusting the same depending upon the planting position of the planter frame.

It is still another object of the invention to provide a throw-out mechanism for planting attachments other than the usual planter clutch type of throw out mechanism.

It is still another object of the invention to provide an arrangement wherein the seed hopper device can be tilted free from its automatic mechanism for the purpose of removing unplanted seed that may be contained therein, the tilting of the seed hopper automatically effecting disconnecting of the seed hopper gear with the drive gear mechanism.

According to the present invention, the seed hopper device is mounted on the planter frame for tilting or vertical movement about its hinged connection with the planter frame. This tilting is automatically effected as the planter frame is raised to a transport position, there being provided means including a cam adapted to react against the under side of the seed hopper device and means reacting against the tractor to effect rotative movement of the cam means. For the purpose of having the seed hopper device return to its normal position there is connected a spring means biased at all times to return the seed hopper device. The seed hopper has gearing adapted to be driven and as it is tilted, this gearing will automatically be disengaged from the tractor drive mechanism including a drive gear located immediately under the seed hopper gear and on the planter frame. The spring means is removably connected to the seed hopper device so that it can be easily removed in case the operator desires to give further tilting movement to the seed hopper device for the purpose of dumping unplanted seeds contained therein. The reacting means includes a pair of telescoping parts on one of which there is a set collar whereby the reacting means can be adjusted depending upon the planting position of the planter frame to thereby regulate the time of disengagement of the hopper device from the drive gear.

For other objects and for a better understanding of the invention, reference may be had to the following detailed description taken in connection with the accompanying drawings, in which.

Figures 1, 4:
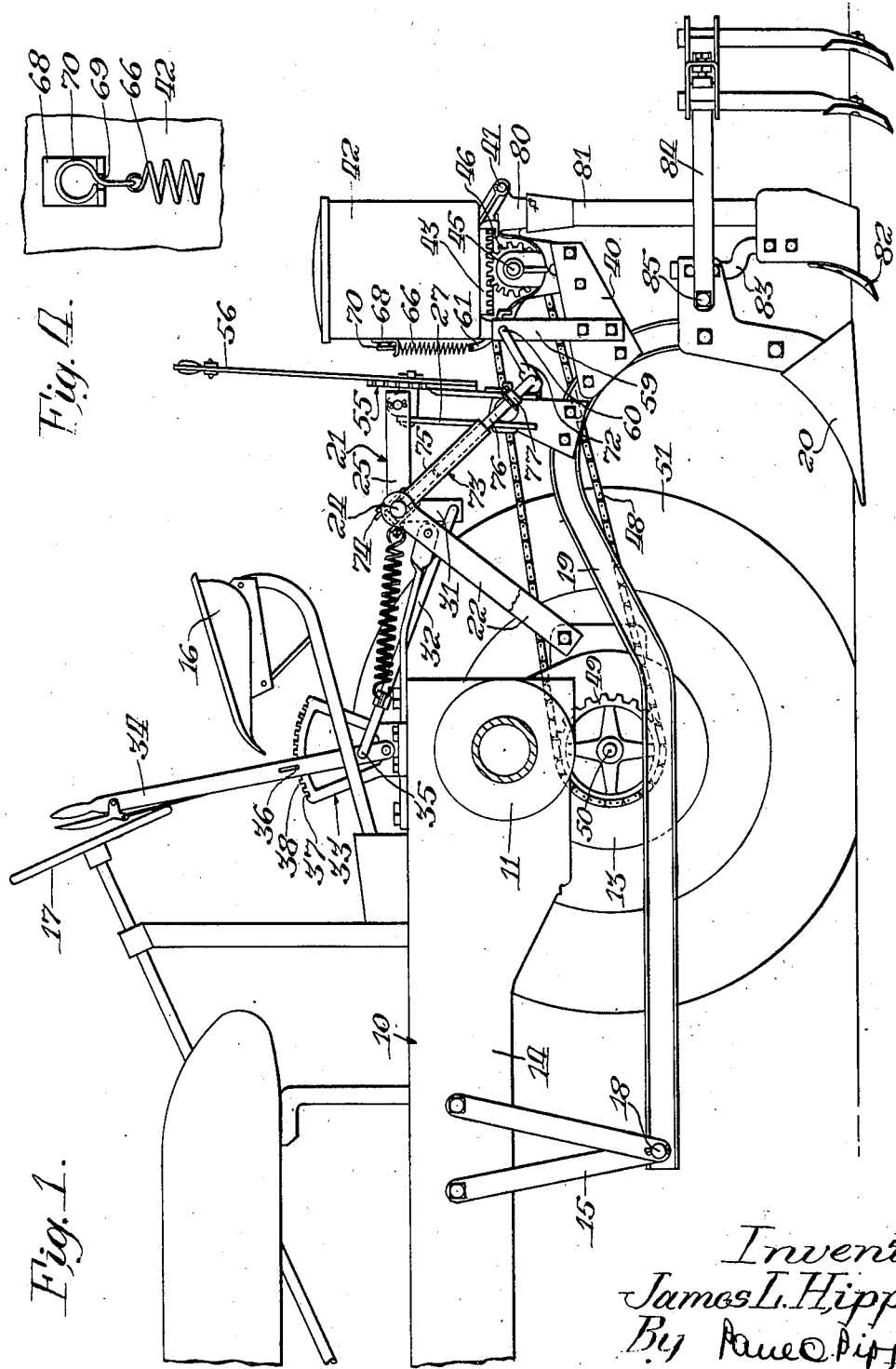
Figure 1 is a side view in elevation of a tractor and of a planting attachment including the features of the present invention connected to the tractor.
Figure 2:
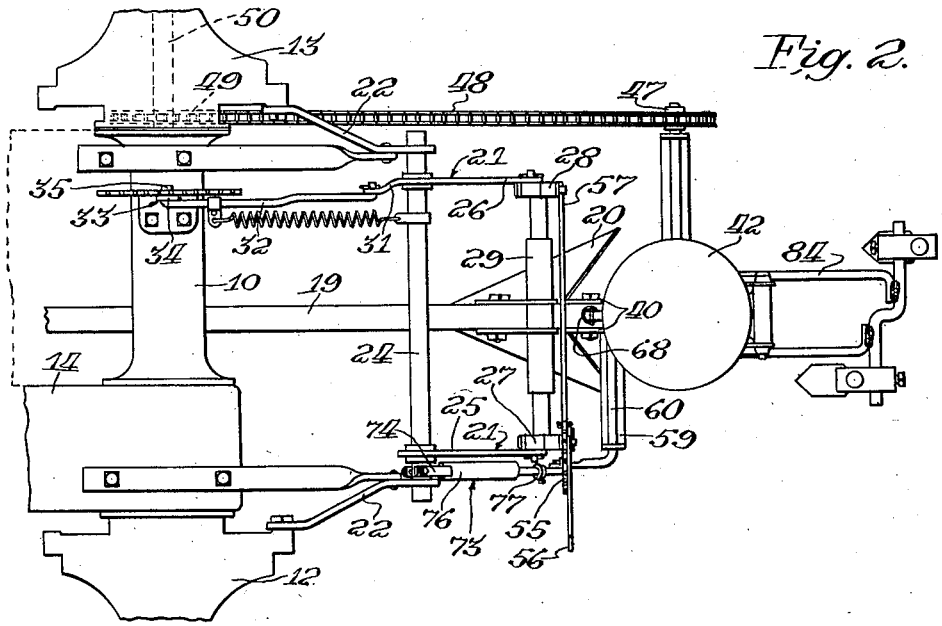
Figure 2 is a fragmentary plan view of the rear portion of the tractor and of the planting attachment.

Referring now to Figures 1 and 2, there is shown a tractor indicated generally at 10 having a rear axle structure 11 and associated depending stub axle housings 12 and 13 located respectively at the left-hand and right-hand sides of the tractor. Extending forwardly from the rear axle structure is the longitudinally extending body portion 14 to which is connected a depending bracket structure 15. On the rear axle structure 11 of the tractor there is located an operator's station 16 accessible to the steering wheel 17 of the tractor.

Pivotally connected to the bracket structure 15 as at 18 is a planter frame 19 which extends rearwardly from the bracket structure 10 to a location in rear of the rear axle structure 11 and having a furrow opening tool 20. This planter frame 19 is connected to the tractor for vertical movement; such movement is effected by means of a lifting arrangement 21 mounted on a rearwardly extending bracket structure 22 for rotational movement about a transverse axis. This lifting arrangement 21 includes a transversely extending shaft 24 having rearwardly extending lifting arms 25 and 26 depending from which are respectively downwardly extending connecting means 27 and 28, each being connected respectively at its upper end to one of the arms for lateral movement with respect thereto, and for rotatable movement in a vertical plane. On the implement frame is a transversely extending means 29 extending respectively at opposite sides of the planter frame for connection with the lower ends of the respective supporting means 27 and 28. The connection of these lower ends with the transversely extending means 29 is likewise for more or less universal movement. It should thus be apparent that the planter frame 19 may have free lateral swinging movement with respect to the tractor, the connection of the planter frame 19 with the bracket structure 15 at 18 being more or less loose to permit this lateral movement. Depending from the transversely extending shaft 24 is an arm 31 to which is connected a lift rod 32 adapted to be actuated by a quadrant and lever adjusting mechanism 33 mounted on the rear axle structure 11 near to the operator's station 16 and having a lever 34, the connection of the lift rod 32 being made to the lever as indicated at 35. The lever 34 carries the usual detent mechanism 36 adapted to cooperate with notches 37 on a quadrant 38 forming also a part of the adjusting mechanisms 33. As the lever 34 is drawn by the operator rearwardly, the left rod 32 is put in compression and the shaft 24 will be rotated in a counterclockwise direction, as viewed in Figure 1, thereby effecting lifting of the planter frame 19 through the arms 25 and 26 and the depending supporting connections 27 and 28.

Mounted on the rear end of the planter frame 19 is a hopper-supporting bracket means 40 to which is pivotally connected at 41 a seed hopper device 42 having a gear 43 adapted to be driven. The hinge connection 41 provides means whereby the seed hopper device 42 may be pivoted for vertical movement with respect to the planter frame.

The seed hopper supporting means 40 also has journaled thereon a shaft 45 containing a drive gear 46 which is so located with respect to the seed hopper device and its driven gear 43 that when the seed hopper device is tilted into its operative position there will be an engagement of the hopper gear 43 with drive gear 46. The shaft 45 extends to the right of the seed hopper device and has thereon a gear 47 from which power may be derived from the tractor by means of a chain drive 48 connected to a gear 49 rigid with the inner end of a stub axle 50 used for driving the tractor drive wheel 51. It should thus be apparent that the power for operating the seed hopper device is thereby obtained from the tractor.

Carried on the connecting means 27 is a manually adjustable means indicated generally at 55 having a lever 56, the lower end of which is connected to a laterally extending member 57 which connects with the lower end of the connecting means 28. By operating the adjusting mechanism 55, the planter frame 19 may be shifted laterally with respect to the arms 25 and 26 of the lifting arrangement 21 and thus with respect to the tractor 10. The link 57 extends from the top of the connecting means 27 to the lower end of the connecting means 28. This means will serve to laterally move the planter frame 19.

Figure 3:
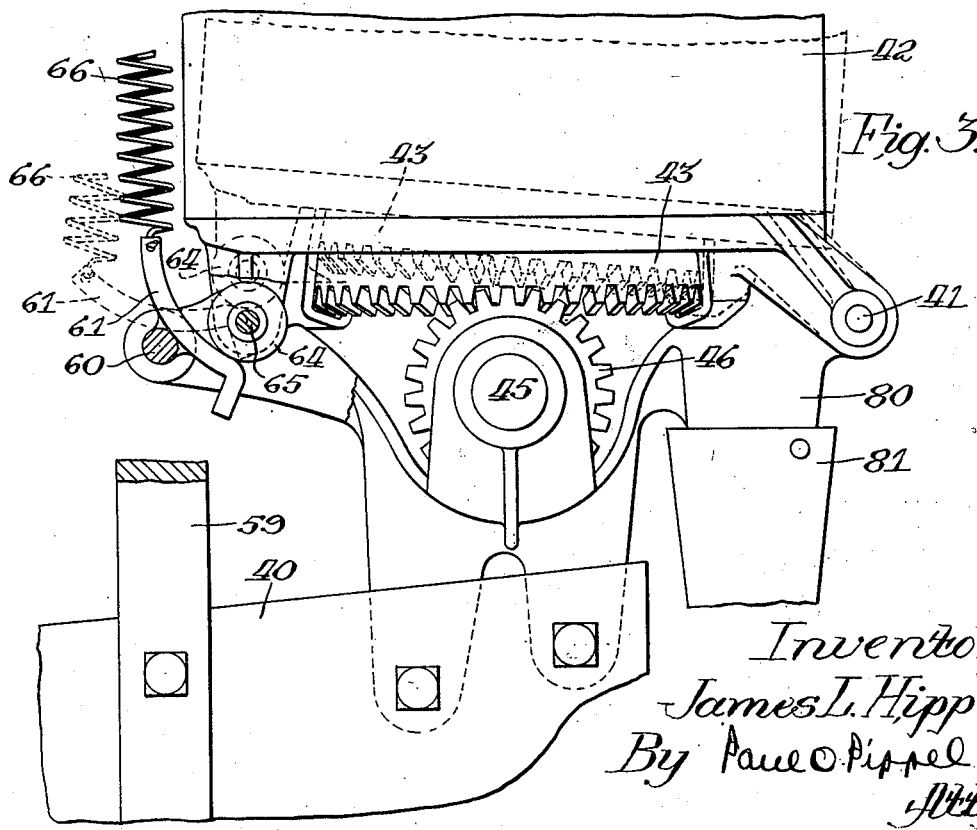
Figure 3 is an enlarged detail view in elevation of the seed hopper device and illustrating particularly the disengagement of the hopper gear from the drive gear on the planter frame; and, Figure 4 is a detail view illustrating the connection of the end of the spring to the seed hopper device.

Referring now particularly to Figures 1 and 3, it will be noted that there is associated with the hopper-supporting means 40 a vertically extending bracket structure 59, the upper end of which supports a transversely extending rockable shaft 60. Intermediate the ends of the shaft there is connected by welding a cam element or means 61. The curved surface of the cam means 61 is adapted to cooperate with a roller 64 carried on the bottom of the hopper device 42. The roller 64 is journaled about a shaft 65 on the hopper device. The roller is held in contact with the surface of the cam element 61 by means of a spring biasing element 66 connected to the cam element 61. The upper end of this spring element 66 is releasably connected to a laterally extending flange 68 on the hopper device 42, as shown in Figure 4. This flange has a slot 69 which receives a hand operated element 70 connected to the upper end of the spring. The purpose of having the connection of the spring made with the hopper device 42, in this manner, is to permit the hopper device to be tilted about its hinged connection 41 to a position whereby the unplanted seeds may be removed from the same. So long as the handle element 70 is engaged with the flange 69, the hopper devices 42 will be resiliently held against any tilting movement. By means of this spring element 67, the hopper device will thus be retained so that the hopper gear 43 will be in mesh with the drive gear 46.

The shaft 60 has a depending arm 72 to the lower end of which there is connected a telescoping means 73 which is in turn connected at its upper end to the transversely extending lifting shaft 24 as indicated at 74. Since this shaft 24 is relatively fixed against any bodily movement with respect to the tractor, it would appear that any movement of the planter frame 19 to a vertical position would not be imparted to telescoping means 73. Thus, there will be a reaction against the tractor which will effect a downward pivotal movement of the arm 72 causing counterclockwise rotation of the shaft 60 and thus of the cam 61 rigidly attached thereto.

The telescoping means 73 includes a sleeve part 75 enclosing a rod part 76. On this rod part 76 is an adjustable set collar means 77. This set collar means may be adjusted to any position along the length of the part 76 to thereby effect the position of abutment of the adjusting means 77 with the end of the sleeve 75.

This adjusting means may have different positions along the rod part 76 depending upon the time of operation desired of the hopper device for the purpose of tilting the same about its hinged connection 41 automatically upon raising of the planter frame and dependent upon the planting position to be assumed by the planting tool relative to the ground. If the planting is to be done down in a furrow, the adjusting means 77 would be located at one position on the rod 76 whereas if the planting is to be done on the top of a ridge, the adjusting means will have a different position on the rod 76.

The cam means 61 upon the planter frame being raised will thereby be caused to bear against the roller 64 to effect tilting movement against the action of the spring element 66 about the hinge connection 41 so that the hopper device will assume a position shown in dotted in Fig. 3 with the gear 43 thereof out of engagement with the drive gear 46. As the planter frame is lowered, this spring element 66 will return the cam 61 to its original position, thereby permitting the hopper device 42 to rotate in a counterclockwise direction for engagement of its gear 43 with the drive gear 46.

Extending laterally from the hopper structure 42 is a spout 80 through which the seed passes to a tube 81 to be deposited in the furrow formed by a furrow opening tool 82. The lower end of the seed tube is received by a supporting means 83 secured to the planter frame 19 with the tool 82. The seed so deposited in the furrow is covered by additional covering tools 82 disposed in trailing relationship with respect to the forward tool 82 and adapted to turn over the ground so that the seeds deposited therein will be covered. These rear covering tools are fastened to the planter frame by a supporting frame 84 adjustably pivoted at 85 therewith.

It should now be apparent that there has been provided a means automatic with the lifting of the planter frame which is of cheap construction and does not include a clutch mechanism whereby the operation of the hopper device is automatically interrupted. It should also be apparent that the arrangement is of very simple construction and thus provides structure which lends itself to the provision of an adjustable means.

While various changes may be made in the detail construction of the present invention, it shall be understood that such changes shall be within the spirit and scope of the present invention as defined by the appended claims.

What is claimed is:

1. In combination, a tractor, planting means including a planter frame connected to the tractor for vertical movement, a seed hopper device attached to the planter frame for movement with respect thereto and having gearing adapted to be driven, drive gear operated by the tractor and carried by the planter frame for driving the gearing of the seed hopper device, and means connected between the tractor and the planter frame and thereby responsive to the vertical movement of the planter frame for bodily moving the hopper device so that its gearing is taken out of engagement with drive gear on the planter frame to effect thereby cessation of operation of the hopper device.

2. In combination, a tractor, planting means including a planter frame connected to the tractor for movement to and from its operating position, a seed hopper device hingedly connected to the planter frame and having gearing adapted to be driven, drive gear operated by the tractor and carried by the tractor frame for driving the gearing of the seed hopper device, means connected between the tractor and the planter frame and thereby responsive to the movement of the planter frame to and from its operating position to bodily move the hopper device about its hinge connection whereby the gearing of the hopper device will be automatically brought into and out of engagement with the drive gear on the planter frame to control thereby the operation of the hopper device.

3. In a planter, supporting means, a planter frame connected to the supporting means for vertical movement, a seed hopper device having gearing adapted to be driven and connected to the planter frame for independent movement with respect thereto, drive gear carried by the planter frame for driving the gearing of the seed hopper device, and means reacting against the supporting means upon vertical movement of the planter frame and seed hopper to move the seed hopper with respect to the planter frame, whereby disengagement of the hopper gearing from the drive gear on the planter frame will be automatically effected.

4. In a planter, supporting means, a planter frame connected to the supporting means for vertical movement, a seed hopper device having gearing adapted to be driven and connected to the planter frame for independent movement with respect thereto, drive gear carried by the planter frame for driving the gearing of the seed hopper device, and means reacting against the supporting means upon vertical movement of the planter frame and seed hopper to move the seed hopper with respect to its planter frame, whereby disengagement of the hopper gearing from the drive gear on the planter frame will be automatically effected, and said reacting means being adjustable to be adapted to different planting settings of the planter frame.

5. In a planter, supporting means, a planter frame connected to the supporting means for vertical movement to and from its planting position, means carried by the supporting means for lifting the planter frame, a drive gear on the planter frame, a seed hopper device connected to the planter frame for movement with respect thereto, said seed hopper device having a gear adapted to be driven by said drive gear during the planting operation, cam means carried by the planter frame for moving the seed hopper device to control thereby the engagement of its driven gear with the drive gear, means reacting against the supporting means upon the planter frame being lifted from its planting position for operating said cam means to cause movement of the seed hopper device and to effect thereby consequent disengagement of the hopper gear and said drive gear, whereby cessation of operation of the seed hopper device will be automatically and positively effected.

6. In a planter, supporting means, a planter frame connected to the supporting means for vertical movement to and from its planting position, means carried by the supporting means for lifting the planter frame, a drive gear on the planter frame, a seed hopper device hingedly connected to the planter frame for vertical movement with respect thereto, said seed hopper device having means adapted to be driven, drive means on the planter frame adapted to drive the seed hopper device when the latter is in its position to effect the planting operation, biasing means tending to maintain the driving and driven means in driving relationship, means reacting between the supporting means and the seed hopper device and against the action of the biasing means upon the planter frame being lifted to hinge the seed hopper device and to thereby separate the driving and driven means.

7. In a planter, supporting means, a planter frame connected to the supporting means for vertical movement to and from its planting position, means carried by the supporting means for lifting the planter frame, a seed hopper device hingedly connected to the planter frame for vertical movement with respect thereto, said seed hopper device having means adapted to be driven, a drive means on the planter frame adapted to drive the seed hopper device when the latter is in its position to effect the planting operation, biasing means tending to maintain the driving and driven means in driving relationship, means reacting between the supporting means and the hopper device and against the action of the biasing means upon the planter frame being lifted to hinge the seed hopper device and to thereby separate the driving and driven means, said reacting means including telescoping parts and adjusting means for varying the amount of telescoping of said part, whereby the same can be adjusted for different planting positions of the planter frame.

8. In a planter, supporting means, a planter frame connected to the supporting means for vertical movement to and from its planting position, means carried by the supporting means for lifting the planter frame, a seed hopper hingedly connected to the planter frame for vertical movement with respect thereto, said seed hopper device having means adapted to be driven, drive means on the planter frame adapted to drive the seed hopper device when the latter is in its position to effect the planting operation, biasing means tending to maintain the driving and driven means in driving relationship, means reacting between the supporting means and the hopper device and against the action of the biasing means, upon the planter frame being lifted to hinge the seed hopper device and to thereby separate the driving and driven means, said seed hopper device being connected to hinge sufficiently to effect removal of the seed therefrom, and said biasing means being releasably connected to the seed hopper device whereby the same may be readily disconnected therefrom when it is desired to remove the seed from the hopper device.

9. In combination, a tractor, a planter frame connected to the tractor for vertical movement to and from its planting position, a seed hopper device connected to the planter frame for vertical tilting movement with respect thereto, said seed hopper having means adapted to be driven, drive means on the planter frame and receiving power from the tractor adapted to drive the seed hopper when it is tilted to its planting position, cam means on the planter frame cooperative with the seed hopper device to cause tilting movement of the latter when it is actuated, means reacting against the tractor to operate the cam means upon movement of the frame from its planting position, and means for lifting the planter frame, whereby said seed hopper device is automatically disconnected from its drive connection with the tractor upon the planter frame being lifted.

10. In combination, a supporting frame, a planter frame pivotally connected to the supporting frame for movement with respect thereto, a seed hopper device connected to the planter frame for bodily movement with respect thereto, said seed hopper device having means adapted to be driven, driving means adapted for engagement with hopper driven means during the planting operation, and means reacting between the two frames upon movement of one with respect to the other to cause bodily movement of the seed hopper device with respect to the planter frame to which it is connected to thereby effect disengagement of the means on the hopper device adapted to be driven and the driving means, whereby cessation of operation of the hopper device will be automatically effected upon movement of the planter frame with respect to the supporting frame.

11. In combination, a tractor, dispensing means including a frame connected to the tractor for vertical movement, a hopper device attached to the frame for movement with respect thereto and having gearing adapted to be driven, a drive gear operated by the tractor and carried by the vertically movable frame for driving the gearing of the hopper device, and means connected between the tractor and the vertically movable frame and thereby responsive to the vertical movement of the frame for bodily moving the hopper device so that its gearing is taken out of engagement with the drive gear on the vertically movable frame to effect thereby cessation of operation of the hopper device.

JAMES L. HIPPLE.